J. C. SEYMOUR.
CAGE FOR MOTOR VEHICLES AND THE LIKE.
APPLICATION FILED JAN. 26, 1917.
1,236,773.
Patented Aug. 14, 1917.
2 SHEETS—SHEET 1.
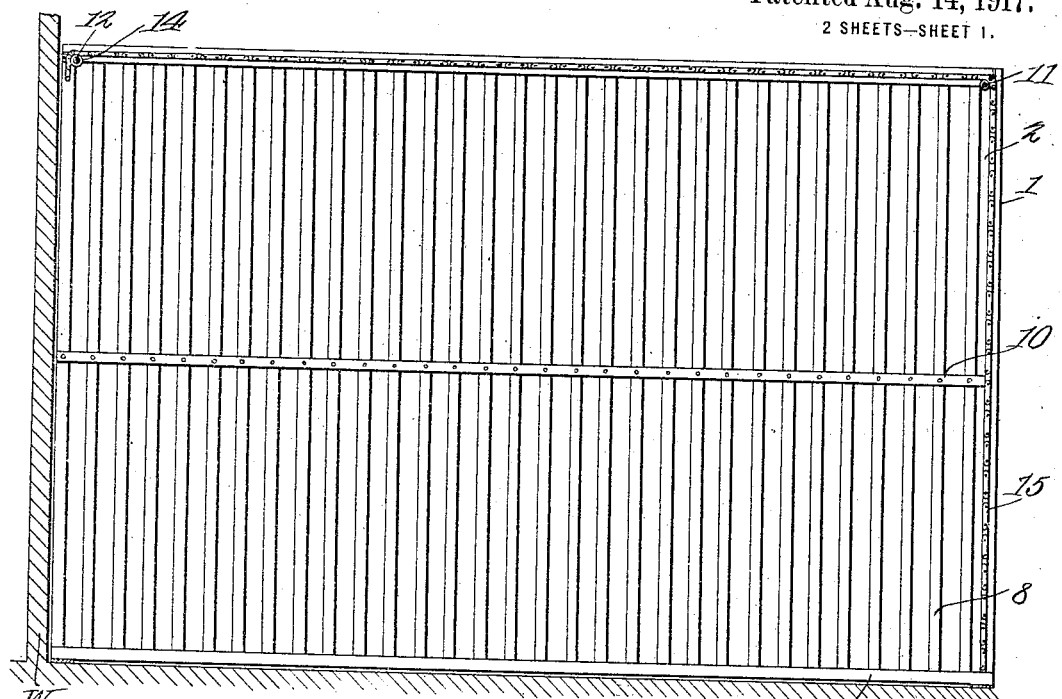
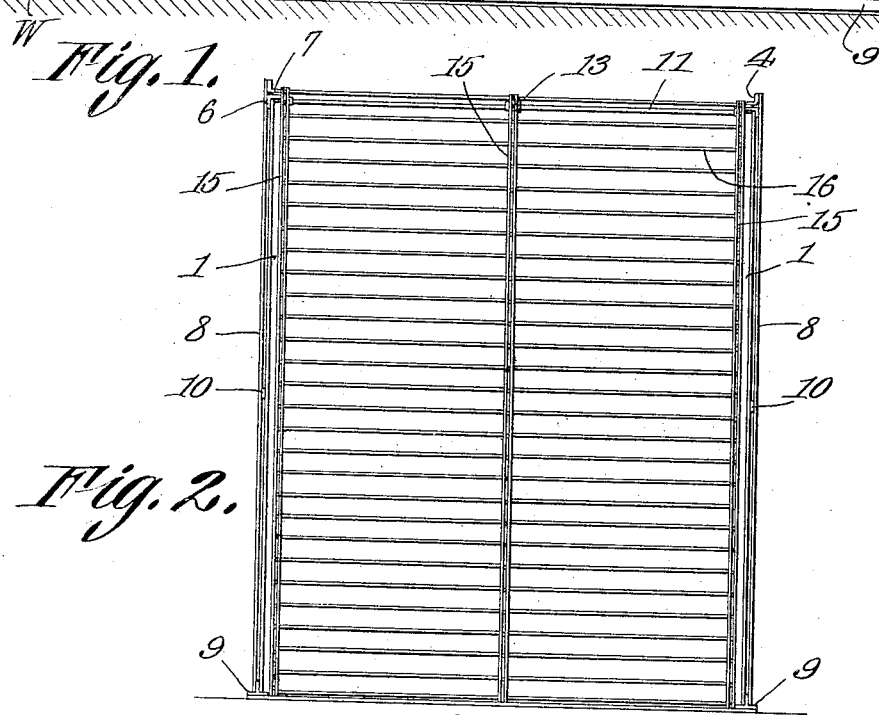
Witnesses
J. C. Seymour
Inventor,
by C. A. Snow & Co.
Attorneys.

J. C. SEYMOUR.
CAGE FOR MOTOR VEHICLES AND THE LIKE.
APPLICATION FILED JAN. 26, 1917.

1,286,773.

Patented Aug. 14, 1917.
2 SHEETS—SHEET 2.

J. C. Seymour
Inventor,

Witnesses
by C. A. Snow & Co.
Attorneys.

UNITED STATES PATENT OFFICE.

JONATHAN C. SEYMOUR, OF BELLEFOURCHE, SOUTH DAKOTA.

CAGE FOR MOTOR-VEHICLES AND THE LIKE.

1,236,773.  Specification of Letters Patent.  Patented Aug. 14, 1917.

Application filed January 26, 1917. Serial No. 144,777.

*To all whom it may concern:*

Be it known that I, JONATHAN C. SEYMOUR, a citizen of the United States, residing at Bellefourche, in the county of Butte and State of South Dakota, have invented a new and useful Cage for Motor-Vehicles and the like, of which the following is a specification.

This invention relates to cages especially designed for holding motor vehicles when stored in a garage, thereby to prevent access to the vehicles by unauthorized persons although leaving the vehicles exposed to view at all times.

Another object of the invention is to provide a cage which can be readily set up in a garage and which has a door designed to be raised or lowered, thus to give access to the interior of the cage or to prevent access thereto.

A still further object is to provide in a structure of this character a door which can be made integral with the top panel, serving to prevent persons from entering the cage at the top.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred forms of the invention have been shown.

In said drawings:—

Figure 1 is a vertical longitudinal section through a cage embodying the present improvements, the slidable closure being shown in elevation.

Fig. 2 is a front elevation of the structure.

Figure 5:
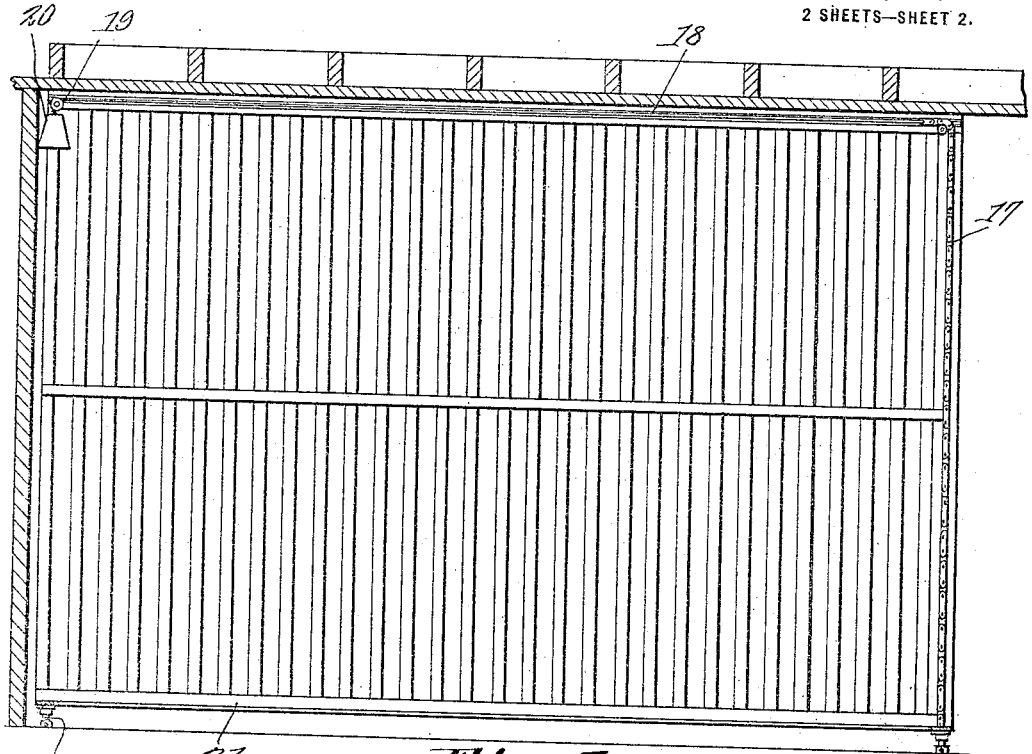
Fig. 5 is a view similar to Fig. 1 but showing a slightly modified form of structure.
Figure 4:
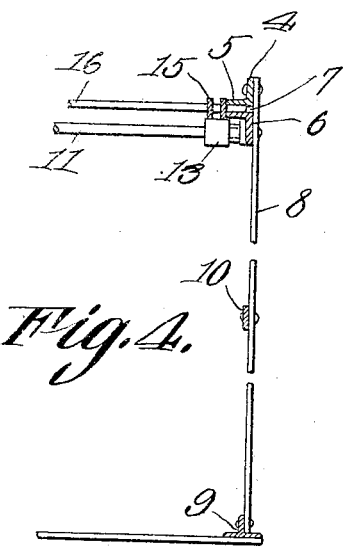
Fig. 4 is a section on line 4—4 Fig. 3.
Figure 3:
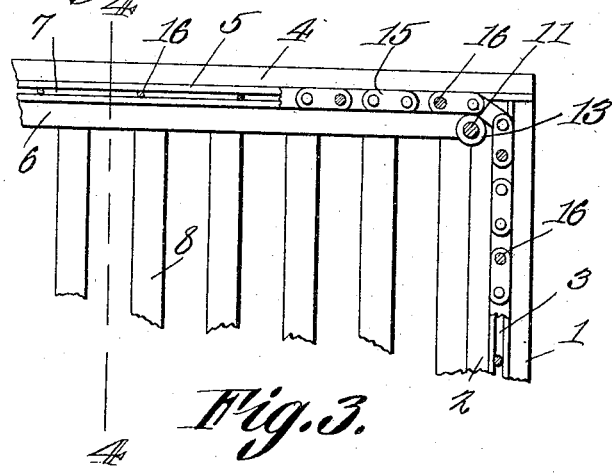
Fig. 3 is an enlarged vertical section through the upper portion of the front of the cage, a portion of the closure being shown in section.

Referring to the figures by characters of reference 1 and 2 designate angle strips arranged in pairs and spaced apart to form a corner post having a longitudinal slot 3 therein. One of these corner posts is provided at each side of the front end of the cage constituting the present invention and extending horizontally from the strips 1 of the corner posts are angle strips 4 having inwardly extending flanges 5. Angle strips 6 are arranged parallel to the strips 4 and are extended from the upper ends of the angle strips 2, the flanges of the strips 4 and 6 being spaced apart to provide longitudinal slots 7 which communicate with the upper ends of the slots 3. The strips 4 and 6 are connected by vertical slats 8 preferably made of metal and which extend throughout the height of the cage, these slats being connected together at their lower ends by anchor strips 9 and, at one or more intermediate points by connecting strips 10. A rod 11 connects the forward ends of the angle strips 6, thus to hold the sides of the cage properly spaced apart and against independent lateral movement. Another rod 12 connects the rear ends of the angle strips 6 for the same purpose. Mounted on the rod 11 are anti-friction rollers 13 and similar rollers 14 are mounted on the rod 12.

Mounted on the rollers 13 and 14 are chains 15 certain of the links of which are connected by transverse rods 16 forming a flexible grating. The ends of the rods project laterally beyond the chains and are adapted to work in the slots 3 and 7. The flexible grating made up of the chains and rods is of such length as to normally extend from the bottom of the front end of the cage upwardly to the rollers 13 and thence rearwardly along the top of the cage to the back end thereof. Any suitable means, not shown, may be provided for locking the closure when in this position and, consequently, if the cage is erected against a wall W, it becomes impossible for anyone to obtain access to the interior of the cage unless the closure is unlocked and opened. After the closure has been unlocked the front portion thereof can be pushed upwardly, thus causing the upper portion to slide rearwardly so that the rear end of the closure will move downwardly across the back of the cage and thus act as a counter balance to facilitate the opening of the closure. During the movement of the closure the ends of the rods 16 will work within the slots 3 and 7.

When the cage is to be placed in a garage or other structure and is to extend close to the ceiling of the room in which it is located, it is not necessary to make the closure as long as has been illustrated in Fig. 1. Said closure, as shown in Fig. 5, may be but slightly longer than the height of the cage and the upper end of this closure which has been indicated at 17 can be connected to cables 18 extending rearwardly along the top of the cage and over pulleys 19, the rear ends of the cables being provided with counter balances 20. The bottom strips 21 of the cage are adapted to be placed on screw jacks 21' resting on the floor of the garage and by adjusting these jacks the top of the cage can be clamped tightly against the ceiling, leaving but a slight clearance between the floor and the bottom strips 21. The door 17 in this modified structure is of the same construction as that hereinbefore described although not as long. The door is to be opened and closed in the same manner as has already been described.

A cage such as herein described can be readily set up in a garage and will afford absolute protection for cars stored therein so that they cannot be used by unauthorized persons and cannot have parts removed from them. Obviously a number of cages can be set up in a row in which event a single side wall or panel can be used as a partition between every two cages, thus reducing the cost to a material extent.

While the form of cage illustrated in Fig. 5 has been shown provided with jacks for binding it against the ceiling of a room, it is to be understood that the form of cage shown in Fig. 1 can be similarly arranged when placed within a room having a low ceiling.

What is claimed is:—

1. A cage for housing vehicles, including side walls made up of connected metal slats, spaced angle strips connecting the upper ends of the slats of each side wall and forming guide slots, spaced angle strips at the front end of each wall and forming a corner post with a longitudinal slot, connections between the upper ends of the side walls at the front and rear thereof, anti-friction devices carried by said connections, and a flexible grating slidably mounted in the slots and normally extended across the front end of the cage, said grating being movable into the slots along the tops of the walls.

2. A cage for housing vehicles, including side walls made up of connected metal slats, spaced angle strips connecting the upper ends of the slats of each side wall and forming guide slots, spaced angle strips at the front end of each wall and forming a corner post with a longitudinal slot, connections between the upper ends of the side walls at the front and rear thereof, anti-friction devices carried by said connections, and a flexible grating slidably mounted in the slots and normally extended across the front end of the cage, said grating being movable into the slots along the tops of the walls and comprising parallel chains and rods connecting certain links of the chains and having their ends projecting laterally therebeyond and into the slots, said chains being mounted on the anti-friction devices.

3. A cage for housing motor vehicles and the like, including spaced angle strips forming corner posts having longitudinal slots, spaced angle strips forming guide slots therebetween and attached to the upper ends of the angle strips of the posts, slats attached to the angle strips and forming the side walls of the cage, anti-friction devices adjacent the upper ends of the posts, and a flexible grating mounted on the anti-friction devices and including parallel chains and rods extending to and laterally beyond certain links of the chains, the ends of the rods being movable in the slots.

4. A cage for housing motor vehicles and the like, including spaced angle strips forming corner posts having longitudinal slots, spaced angle strips forming guide slots therebetween and attached to the upper ends of the angle strips of the posts, slats attached to the angle strips and forming the side walls of the cage, anti-friction devices adjacent the upper ends of the posts, and a flexible grating mounted on the anti-friction devices and including parallel chains and rods extending to and laterally beyond certain links of the chains, the ends of the rods being movable in the slots, said grating normally extending throughout the height of one end of the cage and throughout the length of the top thereof, the back end of the grating being movable downwardly at the back of the cage when the front end of the grating is elevated.

5. A cage for housing motor vehicles and the like, including side walls made up of connected slats and parallel strips forming longitudinal slots extending throughout the length of the cage, corner posts made up of angle strips spaced apart to form longitudinal slots communicating at their upper ends with the first mentioned slots, adjustable supports for binding the upper ends of the panels against the ceiling of a room in which the cage is located, and a flexible closure movable across one end of the cage and rearwardly along the top thereof, said closure including parallel chains and rods connecting and extending laterally beyond the chains, the ends of the rods being movable within the slots.

In testimony that I claim the foregoing as my own, I have hereto affixed my signature in the presence of two witnesses.

JONATHAN C. SEYMOUR.

Witnesses:
J. N. McDONOUGH,
BURT ROGERS.

Copies of this patent may be obtained for five cents each, by addressing the "Commissioner of Patents, Washington, D. C."